US007441700B2

(12) United States Patent
Haas et al.

(10) Patent No.: US 7,441,700 B2
(45) Date of Patent: Oct. 28, 2008

(54) METHOD AND SYSTEM FOR VALIDATING MAIL BALLOTS

(75) Inventors: Bertrand Haas, New Haven, CT (US); Brian A. Lemm, Monroe, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 11/594,449

(22) Filed: Nov. 8, 2006

(65) Prior Publication Data

US 2008/0105741 A1 May 8, 2008

(51) Int. Cl.
*G06F 17/00* (2006.01)

(52) U.S. Cl. .......................................... 235/386; 705/12

(58) Field of Classification Search ................. 235/386; 705/12

See application file for complete search history.

(56) References Cited

U.S. PATENT DOCUMENTS 7,240,835 B2 * 7/2007 Brucker et al. .............. 235/386

* cited by examiner

*Primary Examiner*—Daniel A. Hess
(74) *Attorney, Agent, or Firm*—Brian A. Lemm; Angelo N. Chaclas

(57) ABSTRACT

Methods and systems for validating signatures on ballots sent through the mail that do not require significant amounts of hardware and/or software to perform are provided. The envelope for returning a ballot by mail includes a signature area in which the voter will sign and a reserved area in which no markings are provided. When the envelope is received at the registrar's office, the voter's identification is scanned and the voter's registration signature is retrieved from a registration database. The signature retrieved from the registration database is then provided in the reserved area. The signatures can then be compared directly on the envelope, without the need to image the voter's signature from the envelope and without the use of monitors to display the imaged and retrieved signatures.

10 Claims, 4 Drawing Sheets

METHOD AND SYSTEM FOR VALIDATING MAIL BALLOTS

FIELD OF THE INVENTION

The invention disclosed herein relates generally to voting systems, and more particularly to a method and system for validating signatures on ballots sent through the mail.

BACKGROUND OF THE INVENTION

In democratic countries, governmental officials are chosen by the citizens in an election. Conducting an election and voting for candidates for public office in the United States can be performed in several different ways. One such way utilizes mechanical voting machines at predetermined polling places. When potential voters enter the predetermined polling place, voting personnel verify that each voter is properly registered in that voting district and that they have not already voted in that election. Thus, for a voter to cast his vote, he must go to the polling place at which he is registered, based on the voter's residence. Another method for conducting an election and voting utilizes paper ballots that are mailed to the voter. The voter marks the ballot and returns the ballot through the mail. Mailed ballots have been historically reserved for absentee voting. In the usual absentee voting process, the voter marks the ballot to cast his/her vote and then inserts the ballot in a return envelope which is typically pre-addressed to the voter registrar office in the corresponding county, town or locality in which the voter is registered. The voter typically appends his/her signature on the back of the envelope adjacent to his/her human or machine readable identification.

When the return envelope is received at the registrar's office, the voter signature on the envelope is compared with the voter signature retrieved from the registration file database. This is typically performed by the voter's signature being imaged from the envelope and stored. The imaged signature is then compared on a monitor to the stored signature from the database to make a determination as to whether or not the identification information and signature are authentic and valid. If it is determined that the signature is authentic and valid, the vote included in the envelope will be counted. The identifying information and signature can then be separated from the sealed ballot before it is given to ballot counters for tabulation. In this manner, the privacy of the voter's selections is maintained and thus the ballot remains a "secret ballot."

A problem with such validation processing is that it requires significant resources to perform, including imaging equipment sufficient to read the signature, image databases to store and protect the imaged signatures, and sufficient numbers of monitors to be able to make comparisons of large numbers of signatures in reasonable amounts of time. The increase in the amount of hardware and software necessary to perform this process can significantly increase the costs for validating absentee ballots. Additionally, voting by mail is becoming more prevalent, apart from the usual absentee voting, and in some jurisdictions, entire elections are being conducted exclusively by mail. Thus, there exists a need for efficient methods and systems for validating signatures on ballots sent through the mail.

SUMMARY OF THE INVENTION

The present invention alleviates the problems associated with the prior art and provides methods and systems for validating signatures on ballots sent through the mail that do not require significant amounts of hardware and/or software to perform.

In accordance with the present invention, the envelope for returning a ballot by mail includes a signature area in which the voter will sign and a reserved area in which no markings are provided. When the envelope is received at the registrar's office, the voter's identification is obtained from the envelope and the voter's registration signature is retrieved from a registration database. The signature retrieved from the registration database is then provided in the reserved area, such as, for example, by printing the reference signature directly on the envelope or printing the reference signature on a label that is applied to the envelope. The signatures can then be compared directly on the envelope, without the need to image the voter's signature from the envelope and without the use of monitors to display the imaged and retrieved signatures.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION OF THE PRESENT INVENTION

Figure 1:
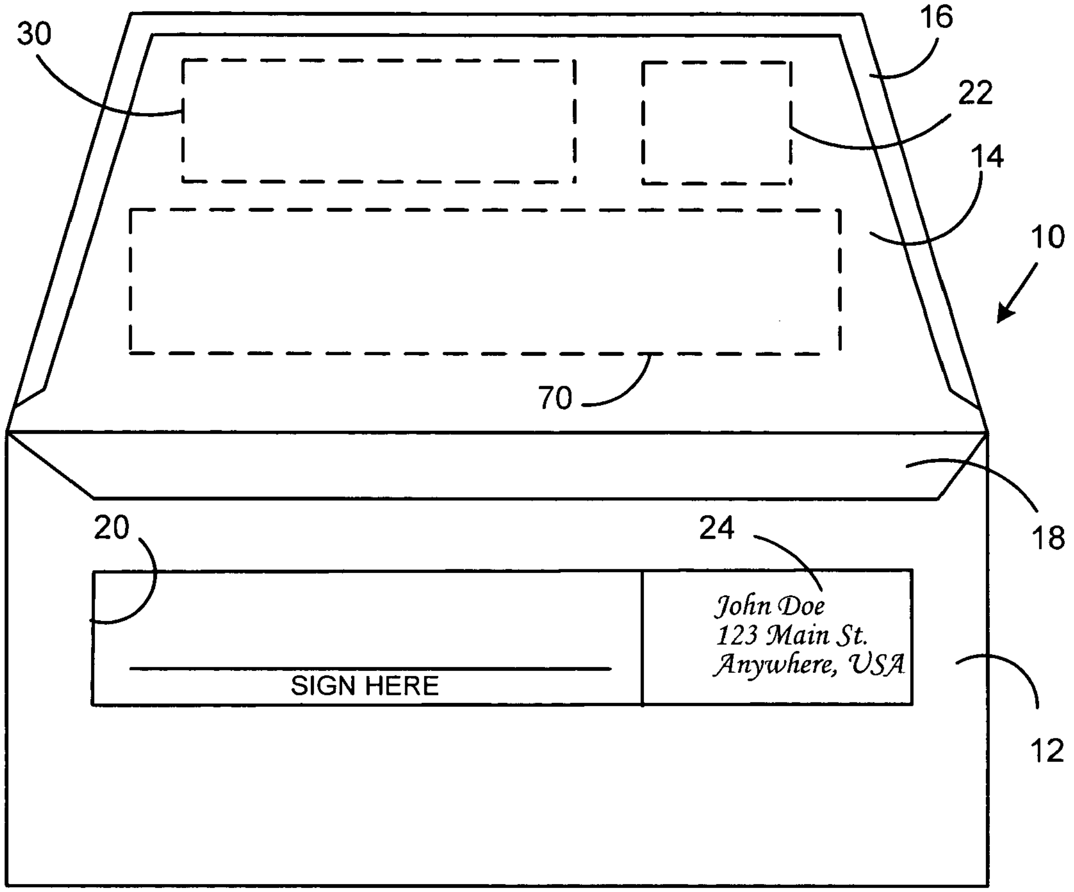
FIG. 1 illustrates an envelope, according to an embodiment of the invention, for returning ballots by mail.
Figure 4:
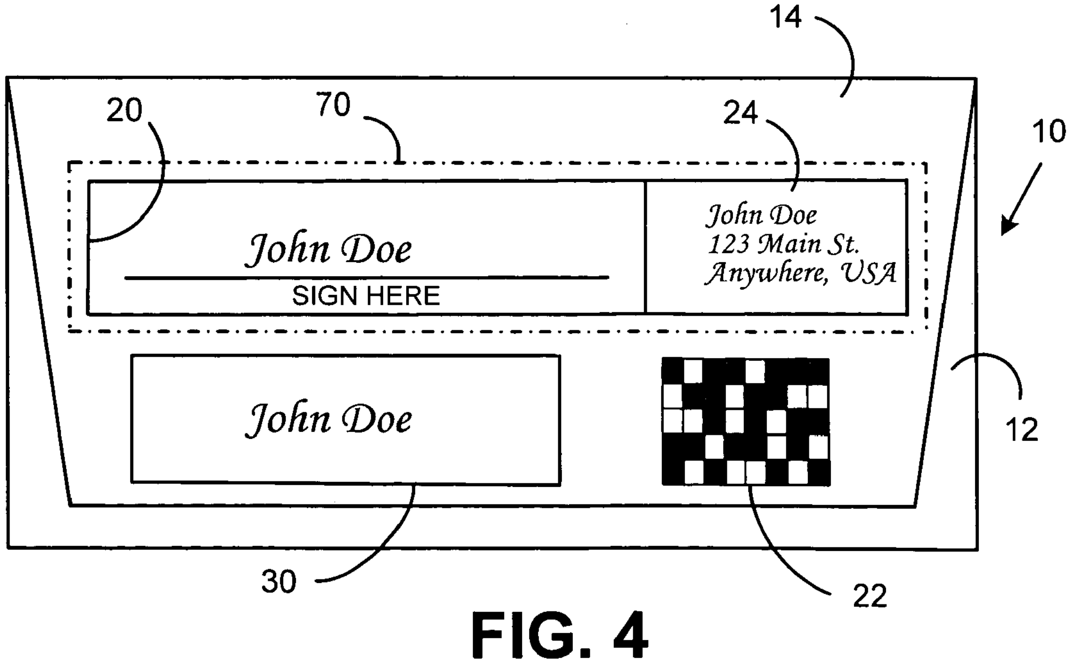
FIG. 4 illustrates the envelope 10 after it has been returned by the voter and processed by the system illustrated in FIG. 2.

In describing the present invention, reference is made to the drawings, wherein there is seen in FIG. 1 an envelope 10 for returning ballots by mail. Envelope 10 includes a body portion 12 and a flap portion 14 connected to the body portion 12. When the flap portion 14 is in an open position as illustrated in FIG. 1, contents, such as, for example, a ballot, can be inserted into a pocket 18 formed by the body portion 12. The flap portion 14 can then be moved to a closed position (as illustrated in FIG. 4), and sealed utilizing a glue or sealing strip 16 which when activated will adhere the flap portion 14 to the body portion 12, thereby covering the pocket 18 and preventing the contents therein from falling out.

The body portion 12 is provided with a signature area 20 intended for the voter's signature. An area 24 that provides voter identification, such as, for example, the voter's name and address, in human readable form may also be provided adjacent to the area 20. An area 22 for the information that identifies the voter may also be provided on the outside of the flap portion 14 (indicated by dashed lines in FIG. 1). Such information is preferably provided in some machine readable form such as a barcode. It should be understood that the locations of each of the areas 20, 22 and 24 on the envelope 10 need not be as shown in FIG. 1, and could be provided in any location on the body portion 12 or the flap portion 14. The flap portion 14 when in a closed position may or may not conceal the areas 20, 22, 24. Flap portion 14 may also be provided with a window (not shown) through which one or more of the areas 20, 22, 24 can be viewed when the flap 14 is in a closed position. Flap portion 14 may also be provided with a tear away tab, indicated by dashed line 70, such that the flap 14 covers one or more areas 20, 22, 24 when in a closed position, but when the tear away tab 70 is removed, the covered areas 20, 22, 24 will be revealed but the contents of the envelope 10 will still be secured in the pocket 18 and will not fall out.

Envelope 10 further includes an area 30 that is reserved for use when processing the envelope 10 as described further below. The area 30 is in a location on the envelope 10 where no other writing or markings will be made and as such remains empty until the envelope 10 is processed as described below. Preferably, the area 30 is located such that it will be adjacent to or near the signature area 20 when the envelope 10 is in a closed position for reasons discussed below. The area 30 may be located on the outside of the flap portion 14 as illustrated in FIG. 1, or alternatively on the body portion 12. For example, if the flap portion 14 is provided with a tear away tab as described above, the reserved area 30 may be provided on the outside of the flap portion 14 (the side that is facing outward when the envelope 10 is sealed) adjacent to the tear away tab 70 as illustrated in FIG. 1. Alternatively, the reserved area 30 may be provided on the body portion 12 adjacent to the signature area 20, and the tear away tab 70 or window sized such that when removed or viewed through, both areas 20 and 30 can be seen.

Figure 2:
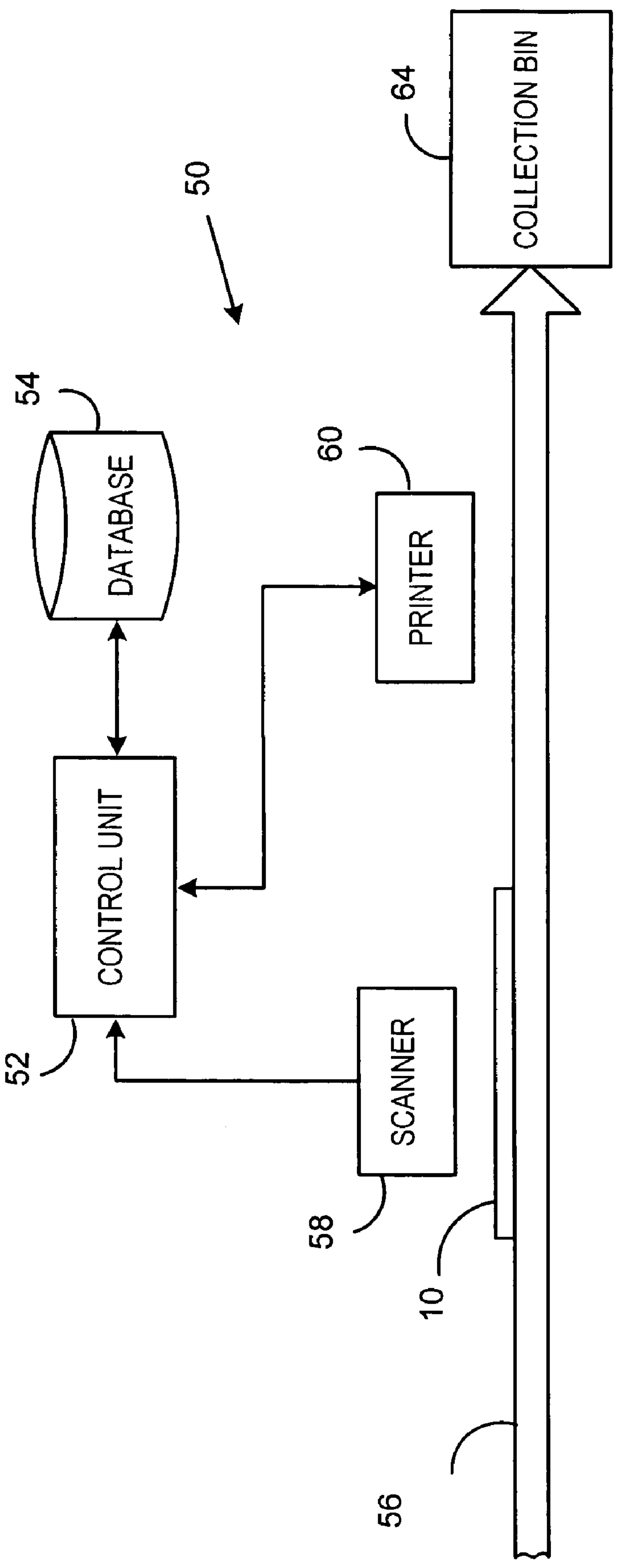
FIG. 2 illustrates in block diagram form a system for processing an envelope according to an embodiment of the invention.

FIG. 2 illustrates in block diagram form a system 50 for processing an envelope according to an embodiment of the invention. System 50 includes a control unit 52, such as, for example, a general or special purpose microprocessor or the like, that controls operation of the system 50. Control unit 52 is connected to a database 54, which is used to store voter information, including, for example, name, address, and a reference signature for use in verifying ballots received by mail as described below. Each voter must provide identification information when registering to vote by mail, including a reference signature for use in verifying the authenticity of a ballot received at the registrar's office by mail. A transport 56, such as, for example, rollers and/or belts, is used to transport a series of envelopes 10 (only one shown in FIG. 2) through the system 50. A scanning device 58 is positioned adjacent to the transport such that the information on the envelope 10 in the identification area 22 and/or 24 can be read and interpreted by the control unit 52. A printing device is coupled to the control unit 52 and located downstream along the transport 56 from the scanner 58. Printing device 60 can be any conventional type of printer, such as, for example, an ink jet printer.

Figure 3:
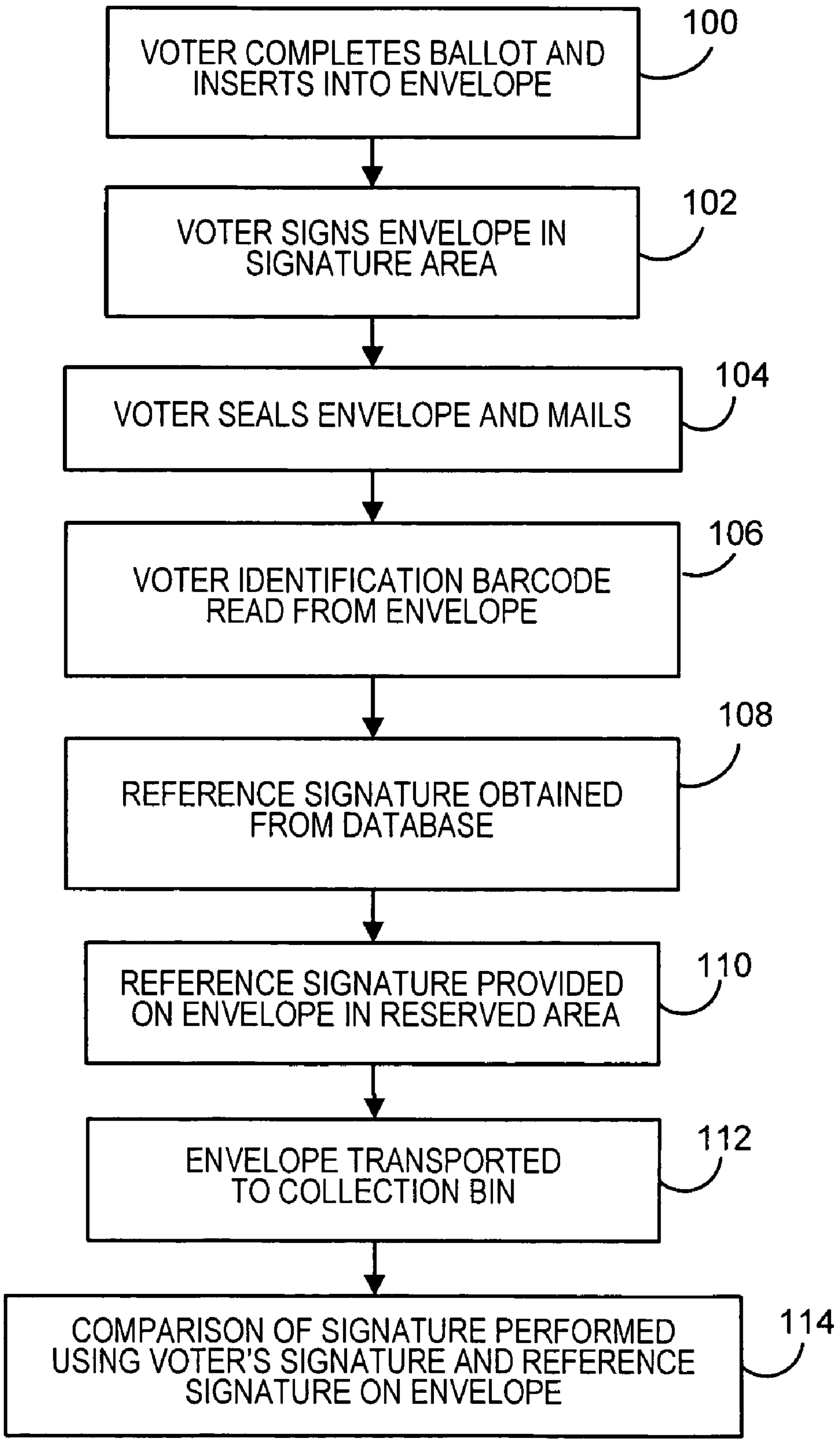
FIG. 3 illustrates in flow diagram form the processing of an envelope for mailing a ballot according to an embodiment of the invention.

FIG. 3 illustrates in flow diagram form the preparation and processing of an envelope 10 according to an embodiment of the invention. In step 100, a voter completes a ballot and inserts it into the pocket 18 of envelope 10. In step 102, the voter signs the envelope 10 in the signature area 20. In step 104, the voter seals the envelope 10 and mails the sealed envelope 10 to the registrar's office. Upon receipt of the envelope 10 at the registrar's office, the envelope 10 can be processed using the system as illustrated in FIG. 2. In step 106, the envelope 10 is transported by the transport 64 past the scanner 58 and the voter identification located in the identification areas 22 and/or 24 are read and provided to the control unit 52. Step 106 can also include removing the flap portion 14, or a tear away tab or the like, to expose the identification areas 22, 24 if necessary to read the identification information included therein. This can be performed manually before the envelop 10 is placed on the transport 56, or can also be done automatically by a device located along the transport 56 upstream of the scanner 58. If the identification area 22 is provided on the outside of the flap portion 12, then it is not necessary to remove the flap portion or tear away tab 70 to read the identification area 22. In step 108, the control unit 52, based on the voter's identification read from the envelope 10, obtains the voter's reference signature that is stored in the database 54. In step 110, the reference signature obtained from the database 54 is provided on the envelope 10 in the reserved area 30. This can be performed, for example, by using the printer 60 to print the reference signature directly on the envelope 10 in the reserved area 30. In step 112, the envelope 10, with the reference signature provided thereon, is transported by the transport 56 to a collection bin 64. The envelope 10 can be retrieved in step 114 at a later time for manual comparison of the voter's signature in the area 20 with the reference signature provided on the envelope 10 in the area 30 by removing the tear away tab 70 (if not already removed), without the need to image the voter's signature from the envelope 10 and without the use of monitors to display the imaged and retrieved signatures.

FIG. 4 illustrates the envelope 10 illustrated in FIG. 1 after it has been returned by the voter and processed as described with respect to FIG. 3. As can be seen in FIG. 4, the envelope 10 includes the reserved area 30 located on the outside of the flap portion 14, and the reference signature obtained from the database 54 has been printed in the reserved area 30. The tear away tab 70 on the envelope 10 illustrated in FIG. 4 has been removed to reveal the voter's signature in the signature area 20, along with the identification information in area 24. Because the reference signature is provided on the envelope 10 near the voter's actual signature, an easy comparison can be performed manually, without the need for any special imaging or display equipment.

Figure 5:
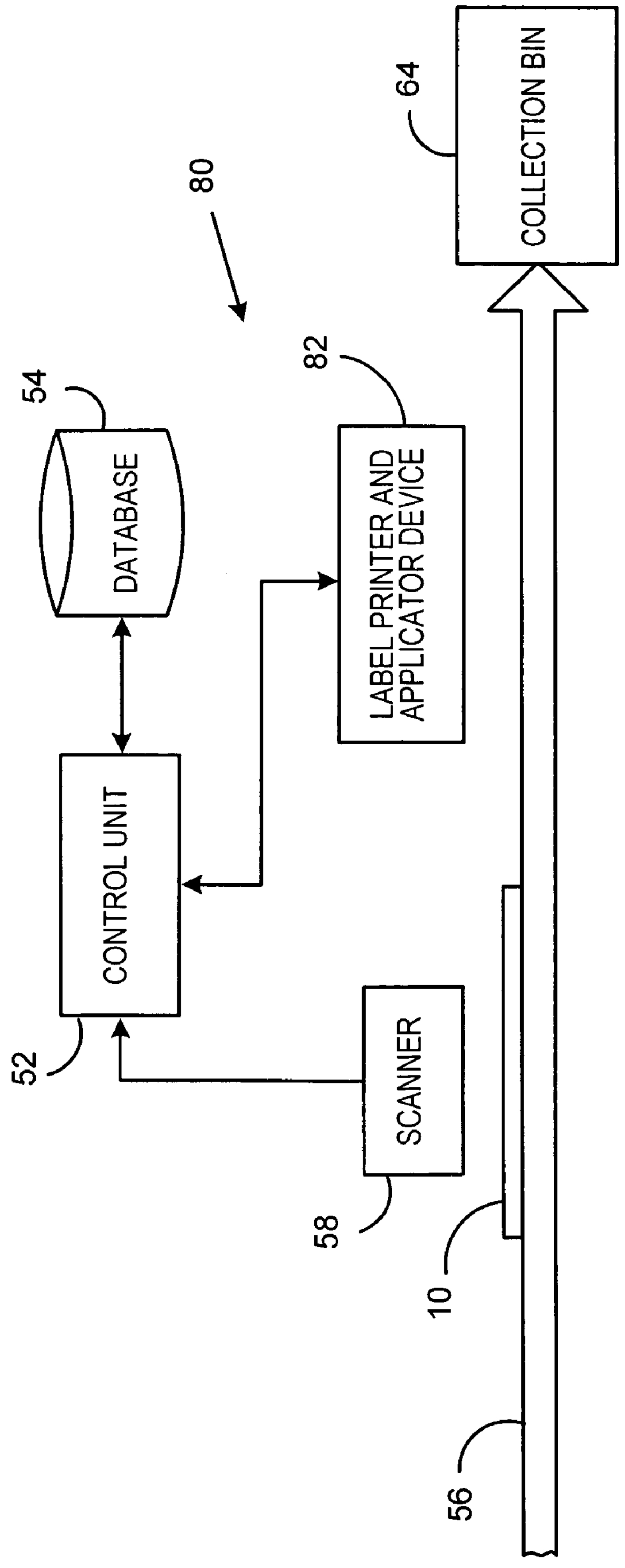
FIG. 5 illustrates in block diagram form a system for processing an envelope according to another embodiment of the invention.

Thus, according to the present invention, methods and systems for validating signatures on ballots sent through the mail that do not require significant amounts of hardware and/or software to perform are provided. Those skilled in the art will also recognize that various modifications can be made without departing from the spirit of the present invention. For example, the reference signature need not be printed directly on the envelope 10, but instead can be printed on a label and the label applied to the envelope 10 in the reserved area 30. FIG. 5 illustrates a system 80 for processing an envelope according to this embodiment of the invention. System 80 is similar to system 50 described with respect to FIG. 2, except that the printer 60 is replaced by a label printer and applicator device 82. The reference signature obtained from the database 54 is printed on a label by the device 82, and then the label is applied by the device 82 to the envelope 10 in the reserved area 30 as it is being transported by the transport 56. The envelope 10 will appear as illustrated in FIG. 4, with the exception that the reference signature is printed on a label applied to the envelope 10 instead of directly on the envelope 10.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for processing a ballot received from a voter in an envelope, the envelope including identification information that identifies the voter and a signature provided by the voter, the method comprising:

reading the identification information from the envelope;

obtaining a reference signature for the voter from a database based on the identification information that is read from the envelope; and providing the reference signature on the envelope.

2. The method according to claim 1, wherein providing the reference signature on the envelope further comprises:

printing the reference signature directly on the envelope.

3. The method according to claim 1, wherein providing the reference signature on the envelope further comprises:

printing the reference signature on a label; and applying the label to the envelope.

4. The method according to claim 1, further comprising:

comparing the reference signature provided on the envelope with the signature provided by the voter to determine the authenticity of the signature provided by the voter.

5. The method according to claim 4, wherein the signature provided by the voter is covered by a tab of the envelope, the method further comprising:

removing the tab to uncover the signature provided by the voter.

6. The method according to claim 1, wherein the identification information that identifies the voter and the signature provided by the voter are covered by a tab of the envelope, and before the identification information is read, the method further comprises:

removing the tab to uncover the identification information and the signature provided by the voter.

7. A system for processing an envelope containing a ballot of a voter, the envelope including identification information that identifies the voter and a signature provided by the voter, the system comprising:

a transport for transporting the envelope through the system;

a reading device to read the identification information that identifies the voter;

a database for storing reference signatures of voters;

a control unit coupled to the reading device and database, the control unit configured to obtain from the database the reference signature for the voter based on the identification information read from the envelope; and a printing device coupled to the control unit to provide the reference signature obtained from the database on the envelope.

8. The system according to claim 7, wherein the printing device is a printer that prints the reference signature directly on the envelope.

9. The system according to claim 7, wherein the printing device is a label printer and applicator device that prints the reference signature on a label and applies the label to the envelope.

10. The system according to claim 7, further comprising:

a collection bin located along the transport for collecting envelopes on which the reference signature has been provided.

* * * * *